(12) United States Patent
Duale et al.

(10) Patent No.: US 9,218,272 B2
(45) Date of Patent: Dec. 22, 2015

(54) SYSTEM LEVEL ARCHITECTURE VERIFICATION OF A TRANSACTIONAL EXECUTION

(71) Applicant: International Business Machines Corporation, Armonk, NY (US)

(72) Inventors: Ali Y. Duale, Poughkeepsie, NY (US); Shailesh R. Gami, Poughkeepsie, NY (US); Dennis W. Wittig, New Paltz, NY (US)

(73) Assignee: International Business Machines Corporation, Armonk, NY (US)

(*) Notice: Subject to any disclaimer, the term of this patent is extended or adjusted under 35 U.S.C. 154(b) by 235 days.

(21) Appl. No.: 13/782,333

(22) Filed: Mar. 1, 2013

(65) Prior Publication Data

US 2014/0250330 A1 Sep. 4, 2014

(51) Int. Cl.
*G06F 11/36* (2006.01)

(52) U.S. Cl.
CPC ........ *G06F 11/3684* (2013.01); *G06F 11/3692* (2013.01); *G06F 11/3672* (2013.01)

(58) Field of Classification Search
CPC ....... G06F 11/22; G06F 11/26; G06F 11/273; G06F 11/263; G06F 11/2635; G06F 11/3672; G06F 11/3692; G06F 11/3684; G01R 31/318385
See application file for complete search history.

(56) References Cited

U.S. PATENT DOCUMENTS

| | | | |
|---|---|---|---|
| 4,354,227 A | 10/1982 | Hays, Jr. et al. | |
| 5,333,297 A | 7/1994 | Lemaire et al. | |
| 5,438,673 A * | 8/1995 | Court et al. | 703/22 |
| 5,488,730 A | 1/1996 | Brown, III et al. | |
| 5,594,741 A | 1/1997 | Kinzelman et al. | |
| 5,845,130 A | 12/1998 | Goff et al. | |
| 6,285,974 B1 | 9/2001 | Mandyam et al. | |
| 6,567,934 B1 | 5/2003 | Yen et al. | |
| 6,629,281 B1 * | 9/2003 | McNamara et al. | 714/733 |
| 6,813,702 B1 | 11/2004 | Ramey et al. | |
| 6,868,325 B2 * | 3/2005 | Menon et al. | 701/100 |
| 7,356,436 B2 * | 4/2008 | Bohizic et al. | 702/119 |
| 7,647,539 B2 | 1/2010 | Bussa et al. | |
| 7,877,742 B2 | 1/2011 | Duale et al. | |
| 8,020,037 B1 * | 9/2011 | Schwartz et al. | 714/6.3 |
| 8,060,727 B2 | 11/2011 | Blixt | |
| 8,191,046 B2 | 5/2012 | Dern et al. | |
| 8,898,652 B2 | 11/2014 | Gray et al. | |
| 2006/0080523 A1 | 4/2006 | Cepulis | |
| 2006/0259705 A1 | 11/2006 | Cousin et al. | |
| 2007/0288189 A1 | 12/2007 | Mishuku | |

(Continued)

OTHER PUBLICATIONS

Harmanci, D., et al.; "Extendable Transactional Memory Testbed"; Preprint submitted to Journal of Parallel and Distributed Computing; p. 1-16; Sep. 30, 2009.
Liu, Y., et al.; "Toxic Transactions"; 6th ACM SIGPLAN Workshop on Transactional Computing, Transact; p. 1-9; 2011.
Manovit, C.; "Testing Memory Consistency of Shared-Memory Multiprocessors"; Dissertation; Stanford University; p. 1-122; Jun. 2006.
Sosnowski, J.; "Software-Based Self-Testing of Microprocessors"; Journal of Systems Architecture; p. 1-15; 2005.

(Continued)

*Primary Examiner* — Joseph Schell
(74) *Attorney, Agent, or Firm* — Cantor Colburn LLP; Steven Chiu

(57) ABSTRACT

Embodiments relate to building, by a computing device, a pseudo-random dynamic instruction stream that comprises instructions configured to perform a transaction execution, testing, by the computing device, the transaction execution in a uni-processing system based on the instruction stream, and outputting, by the computing device, a status of the test to one or more output devices. A determination may be made that an abort occurs in the transaction execution based on the testing.

14 Claims, 3 Drawing Sheets

(56) References Cited

U.S. PATENT DOCUMENTS

| | | |
|---|---|---|
| 2008/0288834 A1 | 11/2008 | Manovit et al. |
| 2010/0205378 A1 | 8/2010 | Moyer |
| 2011/0131452 A1* | 6/2011 | Kumar et al. .................. 714/34 |
| 2012/0226942 A1* | 9/2012 | Gangasani et al. ............. 714/30 |
| 2013/0318400 A1* | 11/2013 | Liang et al. .................... 714/32 |
| 2013/0339327 A1* | 12/2013 | Belmar et al. ................ 707/703 |

OTHER PUBLICATIONS z/Architecture: "Principles of Operation"; Tenth Edition, Sep. 2012; Publication No. SA22-7832-09; copyright IBM Corp.; 1990-2012; p. 1-1568.

* cited by examiner

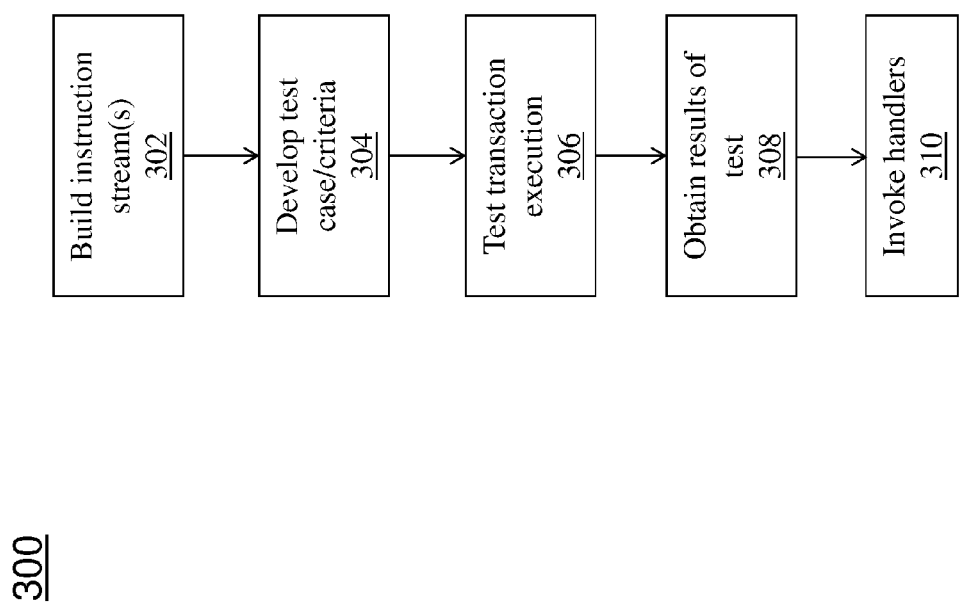

SYSTEM LEVEL ARCHITECTURE VERIFICATION OF A TRANSACTIONAL EXECUTION

BACKGROUND

The present invention relates generally to computer technology, and more specifically to testing transactional execution functionality.

Traditionally, locks were used to control access to a resource in a computing platform. Transactional execution may be used, in lieu of locks, to improve the performance of the platform. Storage accesses performed by a given processor (e.g., a central processing unit (CPU)) within a transaction must appear atomic as observed by other processors.

A transaction may begin and end with one or more machine instructions. For example, a transaction may begin with a TBEGIN instruction and end with a TEND instruction. If a transaction cannot be completed the transaction may be aborted.

BRIEF SUMMARY

An embodiment is directed to a method comprising building, by a computing device, a pseudo-random dynamic instruction stream that comprises instructions configured to perform a transaction execution. The method further comprises testing, by the computing device, the transaction execution in a uni-processing system based on the instruction stream. The method further comprises outputting, by the computing device, a status of the test to one or more output devices.

An embodiment is directed to a computer program product comprising a computer readable storage medium having program code embodied therewith. The program code is executable by a processor to build a pseudo-random dynamic instruction stream that comprises instructions configured to perform a transaction execution. The program code is executable by the processor to test the transaction execution in a uni-processing system based on the instruction stream. The program code is executable by the processor to output a status of the test to one or more output devices.

An embodiment is directed to a computing system comprising a processor and memory having program code stored thereon. The program code, when executed by the processor, causes the computing system to build a pseudo-random dynamic instruction stream that comprises instructions configured to perform a transaction execution. The program code, when executed by the processor, causes the computing system to test the transaction execution based on the instruction stream. The program code, when executed by the processor, causes the computing system to determine that an abort occurs in the transaction execution based on the testing.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

FIG. 3 illustrates a flow chart of an exemplary method in accordance with one or more embodiments.

DETAILED DESCRIPTION

Embodiments described herein are directed to a testing of transactional execution functionality. In some embodiments, pseudo-random, dynamic instruction streams are generated that encompass transactional execution. All architected instructions may be allowed within an instruction stream. Different sets of instructions may react or respond in different ways when in a transactional execution block.

Figure 1:
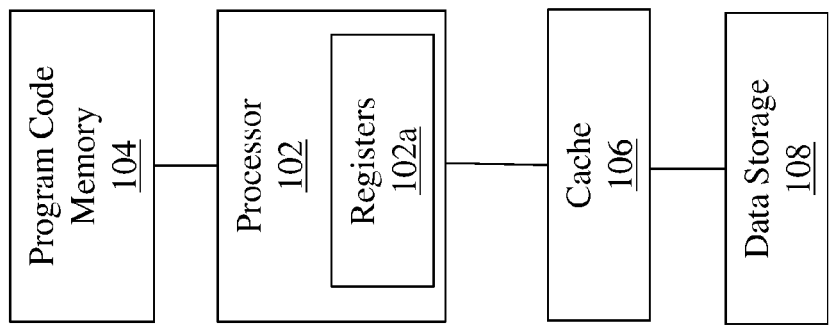
FIG. 1 illustrates a computing system in accordance with one or more embodiments.

Turning now to FIG. 1, a computing system 100 in accordance with one or more embodiments is shown. The system 100 may include a processor 102. The processor 102 may include one or more components or devices. For example, the processor 102 may include one or more registers 102a, such as one or more general purpose registers, floating point registers, etc.

The processor 102 may execute one or more instructions. The instructions may be associated with program code and may be organized at any level of computing abstraction. For example, the instructions may be organized as one or more algorithms, routines, functions, tasks, etc. The program code may be stored in one or more memory devices, such as a program code memory device 104.

The processor 102 may be operative on data. Data may be loaded from memory and stored to the memory. In this regard, the system 100 is shown as including two levels of data memory. A first level cache 106 may be used to store those items of data that are frequently or recently accessed by the processor 102. A second level of data memory, indicated as a data storage 108 in FIG. 1, may be used to store those items of data that are less frequently or less recently accessed by the processor 102. In some embodiments, more or less than two levels of data storage may be used. In some embodiments, the program code memory 104 may be at least partially combined with one or more of the cache 106 and the data storage 108.

The computing system 100 is illustrative. In some embodiments, one or more of the devices or components shown in FIG. 1 may be optional. In some embodiments, additional components or devices that are not shown may be included. In some embodiments, the components/devices of FIG. 1 may be organized or arranged in a manner that is different from what is shown.

A computing system (e.g., the system 100) may be used to test transactional execution function. Transaction execution is described in International Business Machines, "z/Architecture Principles of Operation", SA22-7832-08, tenth edition (September 2012), the contents of which are incorporated by reference.

Traditionally, testing transactional execution poses numerous challenges. Such challenges may include: (1) generating pseudo-random and dynamic instruction streams that encompass the transactional execution facility instructions, (2) detecting and classifying various causes of transaction aborts—some of the aborts may be permanent while others may be intermittent or go away after a number of re-tries, (3) creating an architecturally accepted new machine state after an abort occurs, (4) providing an architecturally accepted machine state that is flexible enough to tolerate for intermittent aborts that do not go away with transaction retries as long as the aborts are architecturally acceptable, (5) assuring storage and other resource restoration when there are permanent aborts or aborts that are tolerable, (6) providing an ability to create and simulate different controls at various levels of nesting. Embodiments may address one or more of the noted challenges, (7) the ability to cause store and fetch overflow while in the transaction, and (8) the ability to provide meaningful Transaction Diagnostic Block (TDB) upon an abort.

In some embodiments, one or more test cases may be used or established. For example, a dual track test case may be generated for a transactional execution.

In some embodiments, test cases may be provided that build transactional execution with an in-built abort handling code. In this manner, an abort can be retried without leaving the processor on which the transaction started, thereby providing quick and easy access to one or more cache lines. The abort handling code may include instructions that examine one or more causes of the abort. If there is a possibility that a transaction could succeed after a number of retries, the abort handling code may cause a retry of the transaction. A test case may be started from the beginning (e.g., restoring all original resources to their actual state) or the beginning of a transaction (e.g., the top-most or outer-most TBEGIN instruction if a transaction is nested within one or more additional transactions). A counter may be used to monitor the number of aborts and force an exit if needed.

In some embodiments, test cases may be provided with transactional execution blocks that do not include in-built abort handling. By not including in-built abort handling, overhead may be removed from an instruction stream, and a test stream may be generated that is more random in nature. One or more causes for an abort may be examined after the end of a test case and a determination may be made regarding whether re-execution of the test case could cause the abort to disappear, potentially as a function of a probability being less than a threshold. In some embodiments, a branch may be taken out of the transaction and processing/execution may continue until, e.g., an interrupt occurs.

In some embodiments, aborts may be detected and classified. For example, two classes may be provided. A first of the two classes may include aborts that are intentionally caused by an instruction stream, such as aborts caused by a program exception or picking a restricted instruction within a transaction. A second of the two classes may include aborts that are due to events external to a test case. For example, an internal timer expiring may cause an abort that would be included in the second class.

In some embodiments, some transactional execution blocks may be retried following an abort. Such aborts may include one or more of a restart, a machine check, an external interrupt abort type, an input/output (I/O) style abort, an undetermined condition, TDB not stored, and transaction footprint overflows. In response to such an abort, the test case may be re-executed or a re-simulation may be performed wherein the test case may be rerun on a result generator.

In some embodiments, some transactional execution blocks might not be retried following an abort. Such aborts may include one or more of an explicit abort instruction (e.g., TABORT), an exception, an execution of one or more restricted instructions, and an overflow.

In some embodiments, when an abort occurs within a transaction, the state of a machine may be restored to the state of the machine at the top-most or outermost Transaction begin instruction (e.g., TBEGIN instruction). Such restoration may include a roll-back of storage and registers to their values prior to that begin instruction.

In some instances, the machine might not be (fully) restored when an abort occurs within a transaction. For example, stores caused by a so-called "non-transactional store" type of instruction may remain in the storage despite the abort. Similarly, if a transaction does not require certain registers to be restored to a prior state, any changes to these registers may remain valid.

Figure 2:
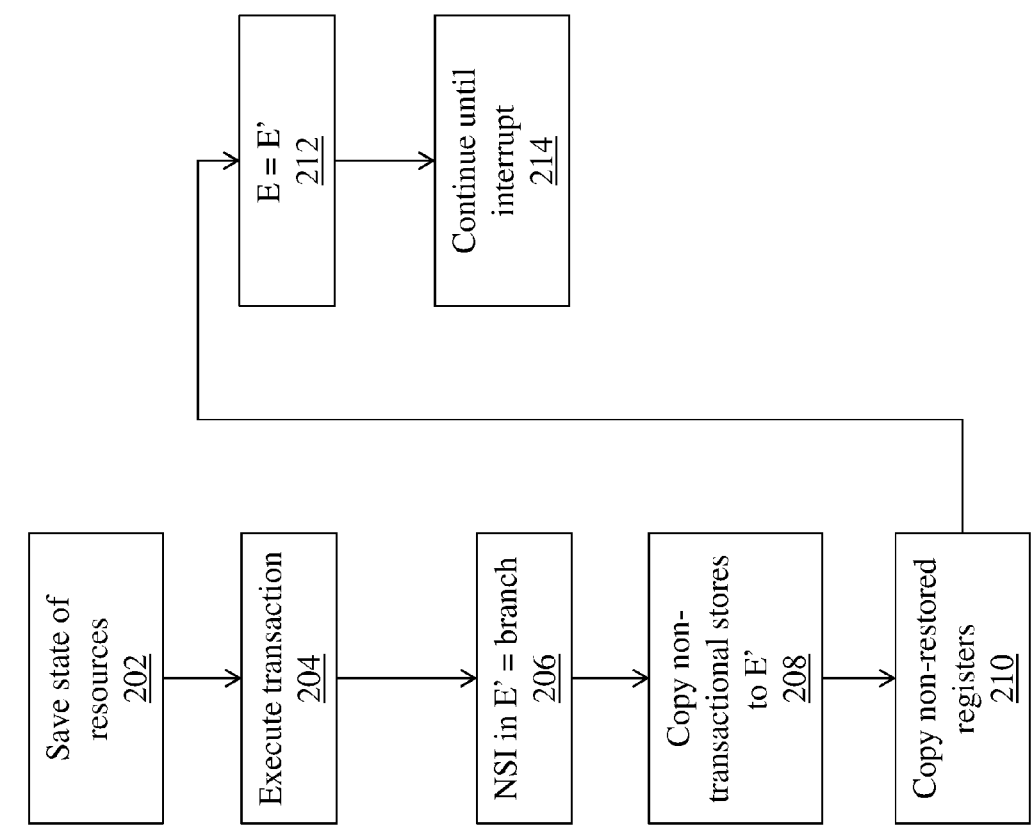
FIG. 2 illustrates a flow chart of an exemplary method in accordance with one or more embodiments.

Turning now to FIG. 2, a flow chart of an exemplary method 200 is shown. The method 200 may be executed by one or more machines or computing platforms, such as the system 100 of FIG. 1. The method 200 may be used to restore the state of a machine. For example, a machine may be restored based on abort occurring within a transaction.

In block 202, the state of architected resources may be saved. The saving may occur upon encountering a TBEGIN instruction, such as an outermost TBEGIN instruction if multiple begin instructions are present. As part of block 202, a variable buffer E' may be set equal to a buffer E, where E equals "expected." Setting E' equal to E may remove a need to undo all individual changes done within a transaction if an abort occurs. Following block 202, E' may have a copy of all the storage that is allocated to, or potentially impacted by, a test case.

In block 204, a transaction may be executed, potentially as part of a test or test case. The test case is simulated and all updates are reflected on E buffer (i.e., it is assumed that there will be no aborts). If there are no architected causes of abort, the transaction is expected to succeed. However, this disclosure takes into consideration cases where the implementation may encounter aborts due to internal or external events. In those cases, the transaction is retried.

In block 206, if an abort is detected, the next sequential instruction (NSI) in E' may be set equal to a branch instruction after the outermost begin instruction. Execution of the block 206 may result in moving the pointer associated with block 202.

In block 208, the non-transactional stores from E may be copied to E'. In this manner, any non-transactional stores that occurred during the transaction may be copied to E'.

In block 210, any non-restored registers may be copied from E to E'.

In block 212, E may be set equal to E', such that the expected states may be based on the restore state.

In block 214, simulation or testing may continue until an interrupt occurs.

Turning now to FIG. 3, a flow chart of an exemplary method 300 is shown. The method 300 may be executed by one or more machines or computing platforms, such as the system 100 of FIG. 1. The method 300 may be used to perform or test a transaction execution.

In block 302, one or more instruction streams may be constructed or built. An instruction stream may be a pseudo-random dynamic instruction stream. In this respect, the instruction stream may include variable or different instructions at different points in time, such that a complete instruction set architecture may be supported. The instruction stream may comprise instructions configured to perform a transaction execution.

In block 304, one or more test cases or test criteria may be developed. The test case/criteria may be developed to determine or more portions of the transaction execution that should be exercised. While shown as a separate block in FIG. 3, in some embodiments block 304 may be combined with block 302 or may precede block 302.

In block 306, the transaction execution may be tested. The testing may occur in accordance with an instruction stream of block 302 and/or a test case of block 304.

In block 308, one or more results of the test of block 306 may be obtained. The results may include a status of the test, such as whether one or more aborts occurred. The results may be output to one or more output devices.

In block 310, one or more handlers may be invoked. For example, a restoration handler may be invoked to restore a machine to a prior state. An interface handler may be invoked to receive input (e.g., user input) regarding how an abort should be handled or processed. Whether and what type of handlers to invoke in block 310 may be a function of the results of block 306.

In some embodiments, an input may be received that indicates a persistent abort tolerance is provided As used herein, the term persistent abort indicates an abort that should go away after some retries but never disappears. For example, it may be possible to create scenarios where the internal state of a machine does not allow a given transaction to succeed even after a number of retries. A user may be provided a choice or option regarding how to proceed when such scenarios are encountered. For example, if a user indicates that a given persistent abort should be tolerated, architected resources may be set to the state before the transaction started. In other words, no leakage may happen to a data storage or registers.

In some embodiments, one or more levels of a transaction may create one or more new controls. For example, a transaction may be started with an indication that floating point instructions are allowed. At some point, a new transaction level that prohibits the use of floating point instructions can be started or indicated. When this latter level is closed, floating point instructions may be allowed to resume. Other controls, such as allowing modifications of access registers and a filtering of exceptions may be handled in a similar manner.

Technical effects and benefits include an ability to test transactional execution functionality. Embodiments of the disclosure provide for pseudo-random instruction and dynamic instruction streams that may be applied at a unit or system level. For example, a test may be applied to a transaction execution in a uni-processing system based on one or more instruction streams. Overall machine state in reaction to transactional execution (e.g., start, stop and abort) may be properly handled. For example, a machine state may be reset in response to an abort.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
   building, by a computing device, a pseudo-random dynamic instruction stream that comprises instructions configured to perform a transaction execution;
   testing, by the computing device, the transaction execution in a uni-processing system based on the instruction stream; and
   outputting, by the computing device, a status of the test to one or more output devices;
   determining, by the computing device, that an abort occurs in the transaction execution based on the testing;
   wherein the abort is intentionally caused by the instruction stream or the abort is due to events that are external to the test case associated with the testing;
   restoring a state of architected resources to a state just prior to the transaction execution based on the occurrence of the abort;
   wherein the restoring comprises:
     saving to a first buffer the state just prior to the transaction execution;
     updating a second buffer during the transaction execution;
     copying non-transactional stores from the second buffer to the first buffer;
     copying non-restored registers from the second buffer to the first buffer; and
     copying the first buffer to the second buffer subsequent to copying the non-transactional stores from the second buffer to the first buffer and copying the non-restored registers from the second buffer to the first buffer.

2. The method of claim 1, wherein the instruction stream comprises nesting levels with at least one control, and wherein the transaction is nested within a second transaction.

3. The method of claim 1, wherein the instruction stream is configured to provide a user with control when an abort occurs in the transaction execution.

4. The method of claim 1, wherein the instruction stream comprises in-built abort handling code.

5. The method of claim 1, further comprising:
   retrying the transaction execution based on the occurrence of the abort.

6. The method of claim 1, wherein one or more levels of the transaction execution create one or more new controls.

7. A computer program product comprising:
   a non-transitory computer readable storage medium having program code embodied therewith, the program code executable by a processor to:
     build a pseudo-random dynamic instruction stream that comprises instructions configured to perform a transaction execution;
     test the transaction execution in a uni-processing system based on the instruction stream; and
     output a status of the test to one or more output devices;
   wherein the instruction stream does not include in-built abort handling code;
   wherein the program code is executable by the processor to:
     examine one or more aborts that occur during the test;
     determine that re-execution of a test case associated with the test would cause the abort to disappear with a probability greater than a threshold; and
     cause a re-execution of the test case based on determining that the re-execution would cause the abort to disappear with the probability greater than the threshold.

8. The computer program product of claim 7, wherein the program code is executable by the processor to:
   determine that an abort occurs in the transaction execution based on the testing.

9. The computer program product of claim 8, wherein the program code is executable by the processor to:
   restore a state of resources to a state just prior to the transaction execution based on the occurrence of the abort.

10. The computer program product of claim 9, wherein the resources comprise at least one storage location and at least one general purpose register.

11. The computer program product of claim 9, wherein the program code is executable by the processor to restore the state of resources by:
saving to a first buffer the state just prior to the transaction execution;
updating a second buffer during the transaction execution;
copying non-transactional stores from the second buffer to the first buffer;
copying non-restored registers from the second buffer to the first buffer; and
copying the first buffer to the second buffer subsequent to copying the non-transactional stores from the second buffer to the first buffer and copying the non-restored registers from the second buffer to the first buffer.

12. A computing system comprising:
a processor; and
memory having program code stored thereon that, when executed by the processor, causes the computing system to:
build a pseudo-random dynamic instruction stream that comprises instructions configured to perform a transaction execution;
test the transaction execution based on the instruction stream;
determine that an abort occurs in the transaction execution based on the testing;
receive an input that indicates that specified persistent aborts are tolerated; and
confirm, based on the input, that architected resources are set to a state prior to the transaction execution so that no leakage happens to a data storage.

13. The computing system of claim 12, wherein the program code, when executed by the processor, causes the computing system to:
restore a state of resources to a state just prior to the transaction execution based on the occurrence of the abort by:
saving to a first buffer the state just prior to the transaction execution;
updating a second buffer during the transaction execution;
copying non-transactional stores from the second buffer to the first buffer;
copying non-restored registers from the second buffer to the first buffer; and
copying the first buffer to the second buffer subsequent to copying the non-transactional stores from the second buffer to the first buffer and copying the non-restored registers from the second buffer to the first buffer.

14. The computing system of claim 12, wherein one or more levels of the transaction execution create one or more new controls, and wherein the one or more new controls indicate at least one of: whether a use of floating point instructions is allowed, whether access registers can be modified, and a specification of a filtering exception.

* * * * *